June 15, 1971 J. R. McGOWAN 3,584,363

ASSEMBLY DEVICE FOR ESCAPING AND POSITIONING PART MEMBERS

Filed Dec. 27, 1968 2 Sheets-Sheet 1

JAMES R. McGOWAN
INVENTOR.

James J. Wood
Robert W. Hampton
ATTORNEYS

June 15, 1971  J. R. McGOWAN  3,584,363
ASSEMBLY DEVICE FOR ESCAPING AND POSITIONING PART MEMBERS
Filed Dec. 27, 1968  2 Sheets-Sheet 2

JAMES R. McGOWAN
INVENTOR.

James J. Wood
Robert W. Hampton
ATTORNEYS

United States Patent Office 3,584,363
Patented June 15, 1971

3,584,363
ASSEMBLY DEVICE FOR ESCAPING AND POSITIONING PART MEMBERS
James R. McGowan, Spencerport, N.Y., assignor to Eastman Kodak Company, Rochester, N.Y.
Filed Dec. 27, 1968, Ser. No. 787,383
Int. Cl. B23q 7/10
U.S. Cl. 29—211                                                6 Claims

ABSTRACT OF THE DISCLOSURE

This disclosure relates to an automatic escaping and positioning device for supplying part members to an assembly station. A plurality of escaping passages in a support member, are adapted to receive the parts to be assembled. A clamping element arranged in a slot communicating with the escaping passages, and connected to a linkage element, successively assumes a first position in the slot, clamping a part member in the escaping passage, and then a second position in the slot releasing the part member for gravity free fall toward the assembly station, in response to predetermined timed actuation of the linkage element.

BACKGROUND OF THE INVENTION (1) Field of the invention

This invention relates to an automatic escaping and positioning device for controllably supplying part members to an assembly station.

(2) Description of the prior art

It is broadly known in the art to use the escaping tube technique for successively supplying parts in a mass production line to enable rapidity of assembly.

SUMMARY OF THE INVENTION

This invention relates to a device for escaping and positioning part members in production line assembly. A support means, having at least one escaping passage, is adapted for receiving a plurality of part members; a clamping slot in the support means communicates with the escaping passage. At least one linkage means, having a clamping means secured thereto adapted for sliding movement within said clamping slot, is arranged for displacement by mover means. The clamping means, in response to the actuation of the linkage means by the mover means, successively advances from a first position wherein the part member in the escaping passage is held in clamping engagement, to a second position wherein the part member in said escape passage is then released for gravity free fall toward an assembly position.

An object of this invention is to provide a device for escaping and positioning functions in assembly operations, having a high order of reliabilty, with easy accessbility in the event of a jamming situation.

The novel features of the invention are set forth with particularity in the appended claims, the invention itself, however, both as to its organization and method of operation together with further objects and advantages thereof may best be understood by reference to the description to follow, considered in connection with the accompanying drawings.

DESCRIPTION OF THE PREFERRED EMBODIMENT

The instant invention is intended for utilization in production line assembly equipment where a supply of part member is required to be positioned and fed in controlled relation to successively advancing assembly stations arranged along a moving production line.

Figure 1:
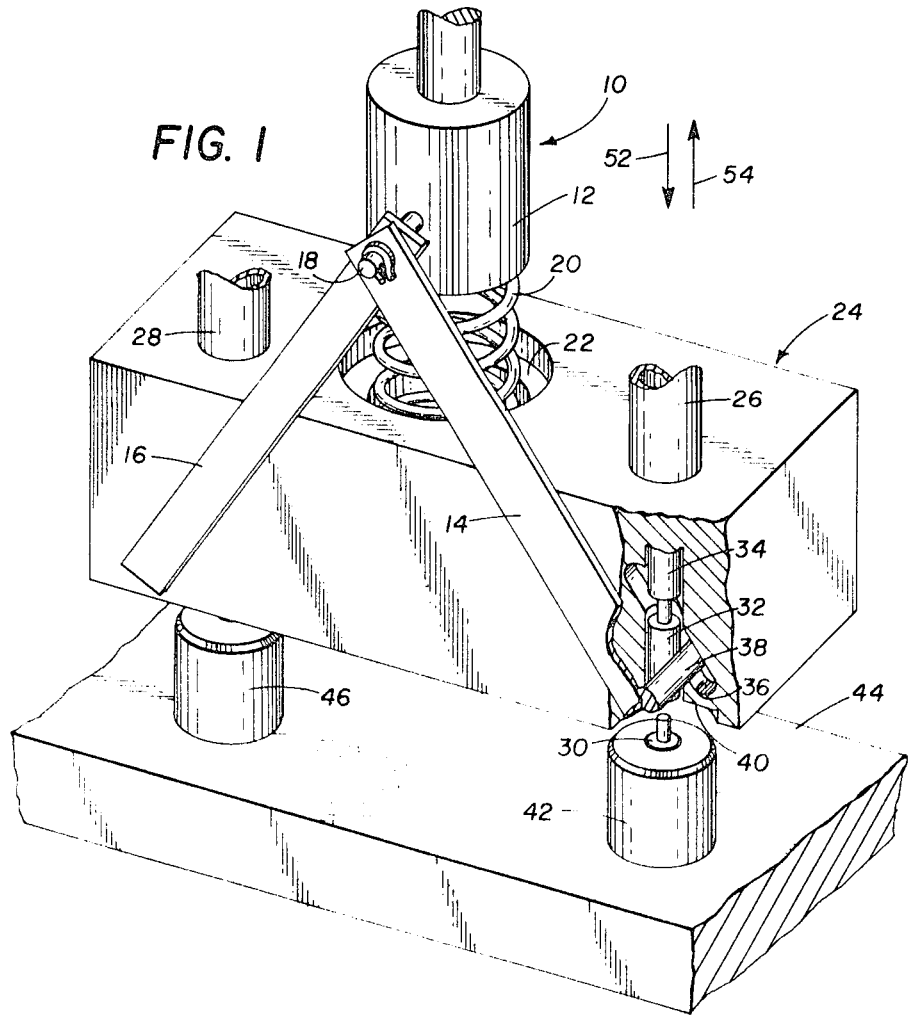
FIG. 1 is a pictorial view showing the assembly device of the instant invention, depicting a part member already positioned at an assembly station, and showing a succeeding part member in position in an escaping tube with release impending.

Referring now to FIG. 1, an air cylinder is indicated generally at 10; the air cylinder 10 includes a displaceable member 12, to which is attached linkage means 14, 16 which are secured thereto in any convenient manner such as by a pin 18. The member 12 of the air cylinder 10 acts against the biasing discipline of a helical spring 20 which is arranged in a suitable recess 22 positioned in the top of support means indicated generally at 24. The support means 24 is apertured to receive one or more escaping passages 26, 28.

In the interest of simplicity, the remaining description of FIG. 1 will be concerned with linkage means 14, escaping passage 26 and their respective cooperating components, although it will be understood that complementary components exist for all linkage means and escapement passages. The escaping passage 26 leads to a supply hopper (not shown) and as may be observed from a study of FIG. 1, the escapement passage 26 is internally recessed so as to provide a constrained path for part members arbitrarily identified at 30, 32, 34.

The support means 24 is machined to provide an inclined clamping slot 36 which communicates with passage 26, and which is adapted to receive clamping means 38 in sliding displacement, clamping means 38 being connected to linkage 14 in any convenient manner. In the same applications, the support means 24 may be provided with a locating recess 40 having a geometric configuration adapted to conform with any mating means at the assembly station, and in the illustrative embodiment, it has a diameter slightly greater than the boss 42 carried by an assembly table 44; the table 44 also supports a similar boss 46 working in cooperation with the escapement tube 28.

Figure 2:
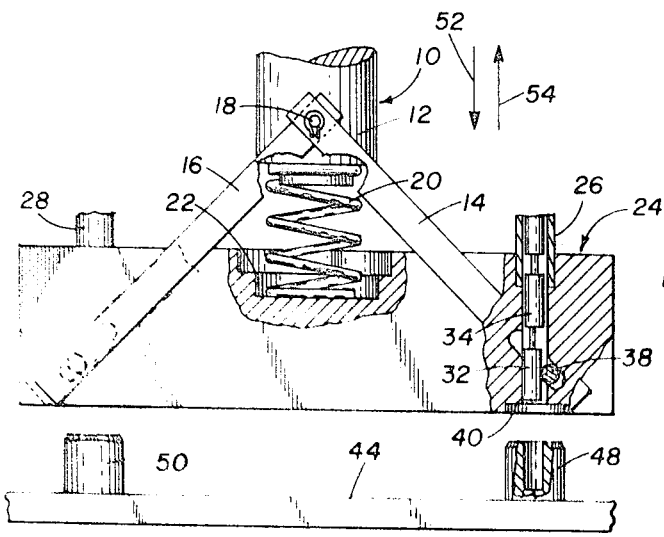
FIG. 2 is a schematic sectional view of the assembly device of the instant invention, with the production line having advanced, so that the next assembly station is in receiving position with deposit of a part member impending.

In FIG. 2 the table 44 has advanced to the next succeeding assembly station, so that similar bosses 48, 50 are in position ready to receive appropriate part members. As will be noted in FIG. 2 the part member 32 intended for boss 48 is held in clamping position by the clamping means 38.

Figure 3:
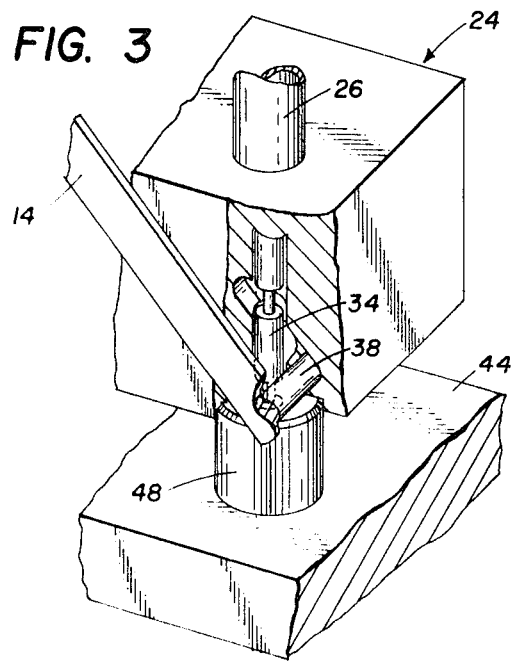
FIG. 3 is a pictorial view, partly cut away, showing details of the assembly mechanism after a part member has been deposited at the assembly station shown in FIG. 2.
Figure 4:
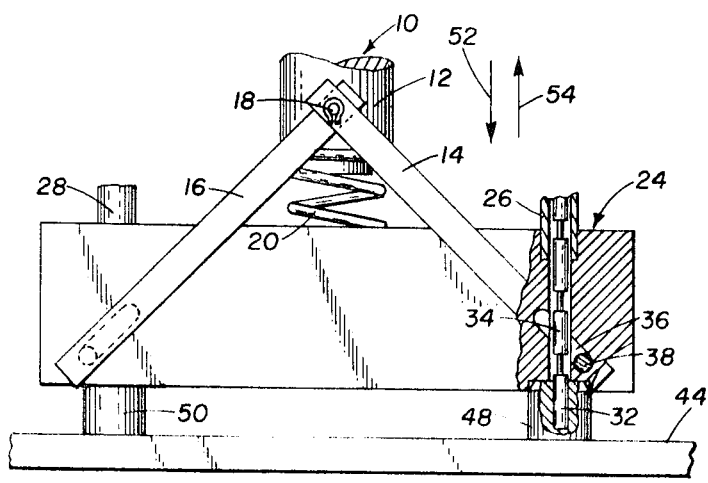
FIG. 4 is a schematic sectional view showing more details of the physical arrangement depicted in FIG. 3.

Referring now to FIGS. 3 and 4 the clamping means 38 is in the nesting or release position, part member 32 (FIG. 4) has been deposited in the boss 48, and the next succeeding part member 34 is held in its vertical position by means of deposited part member 32. This may best be observed in FIG. 4 which shows the cooperating relationship between part members 32, 34 and the clamping means 38.

OPERATION OF THE DEVICE

In operation, the part members to be assembled are positioned in the escapement passages 26, 28 from a supply source. The air cylinder 10 is actuated in predetermined timed relationship to the travel of the table 44 along the production assembly line.

When the table 44 has arrived at an assembly station such as depicted in FIG. 2, the air cylinder 10 is displaced downward in the direction as shown by the arrow 52. This motion is transmitted to the linkage arm 14 which moves the clamping means 38 in the clamping slot 36 toward its nesting position. The displacement of the linkage arm is shown partly in phantom section for linkage means 16 (FIG. 2). At the same time there is sufficient play in the support means 24 so that the recess 40 moves into mating engagement with boss 48.

When the clamping means 38 is in the nesting position (FIGS. 3, 4) the next in line part member 32 drops into the recess in boss 48, and at the same time the next part member 34 drops down in the escaping tube 26 in gravational descent defined and limited by the geometry of the deposited part member 32.

The air cylinder 10 is then displaced in the direction indicated by the arrow 54 under the biasing discipline of spring 20, and clamping means 38 retreats from its nesting position and in doing so it clamps the next succeeding part member 34 by displacing it slightly upwardly, and preventing it from dropping down as the table 44 is advanced to the next station. (The described clamping operation physically is exactly as shown in FIG. 1 for part member 32.)

The invention has been described in detail with particular reference to a preferred embodiment thereof, but it will be understood that variations and modifications can be effected within the spirit and scope of the invention.

I claim:

1. An assembly device for escaping and positioning part members, said assembly device comprising:
    (a) a support member defining (1) an escaping passage for receiving a plurality of such part members and (2) a clamping slot communicating with said escaping passage;
    (b) pneumatic means having a displaceable member;
    (c) a clamping element slidably positioned within said clamping slot, said clamping element being displaceable in said clamping slot between a first position wherein a part member received in said escaping passage is clamped thereby and a second position releasing such a received part member for delivery to an assembly station; and
    (d) a linkage interconnecting said displaceable member and said clamping element for effecting movement of said clamping element between its first and second positions in response to movement of said displaceable member.

2. An assembly device according to claim 1 further comprising means for automatically positioning said escaping passage in aligned relationship with said assembly station including means on said support member defining a configuration complementary to mating means at said assembly station.

3. An assembly device according to claim 1 wherein said clamping slot has an axis inclined to said escaping passage such that orthogonal displacement of said displaceable member is translated as a non-orthogonal vector force within said clamping slot.

4. An assembly device for escaping and positioning part members at an assembly station, said assembly device comprising:
    (a) a support member defining (1) an escaping passage formed to reecive a plurality of such part members, (2) a clamping slot communicating with said escaping passage, and (3) a configuration complementary to mating means at said assembly station for assisting in positioning said escaping passage in aligned relationship with respect to said assembly station;
    (b) pneumatic means having a displaceable member movable between first and second positions;
    (c) spring means urging said movable member towards its first position;
    (d) a linkage secured to said displaceable member and adapted for actuation thereby; and
    (e) a clamping element secured to said linkage and having a portion thereof positioned within such slot for sliding displacement within said clamping slot such that (1) movement of said displaceable member to its second position moves said clamping element in said clamping slot to a first position wherein a part member in said escaping passage is held in clamping engagement, and (2) movement of said displaceable member to its first position moves said clamping element in said clamping slot to a second position wherein the said part member in said escaping passage is then released for delivery to an assembly position.

5. An assembly device according to claim 4 wherein said clamping slot has an axis inclined to the longitudinal axis of said escaping passage such that orthogonal displacement of said displaceable member is translated as a non-orthogonal vector force within said clamping slot.

6. An assembly device for escaping and positioning part members at an assembly station, said assembly device comprising:
    (a) a support member defining (1) an escaping passage formed to receive a plurality of such part members and (2) a clamping slot communicating with said escaping passage, said support member including automatic means for positioning said escaping passage in aligned relationship with said assembly station;
    (b) a clamping element slidably positioned within said clamping slot, said clamping element being displaceable in said clamping slot between a first position wherein a part member received in said escaping passage is clamped thereby and a second position releasing such a received part member for gravity free fall toward said assembly station; and
    (c) means for selectively displacing said clamping element between said first and second positions.

References Cited
UNITED STATES PATENTS

| | | | |
|---|---|---|---|
| 1,250,741 | 12/1917 | Wickham | 29—212X |
| 1,791,967 | 2/1931 | Mansfield | 29—211 |
| 2,540,572 | 2/1951 | Engeln et al. | 29—211X |

HARRISON L. HINSON, Primary Examiner